Oct. 29, 1940. C. A. EVERETT 2,219,572
METHOD OF AND APPARATUS FOR FACILITATING INSPECTION OF GLASS ARTICLES
Filed Oct. 22, 1938
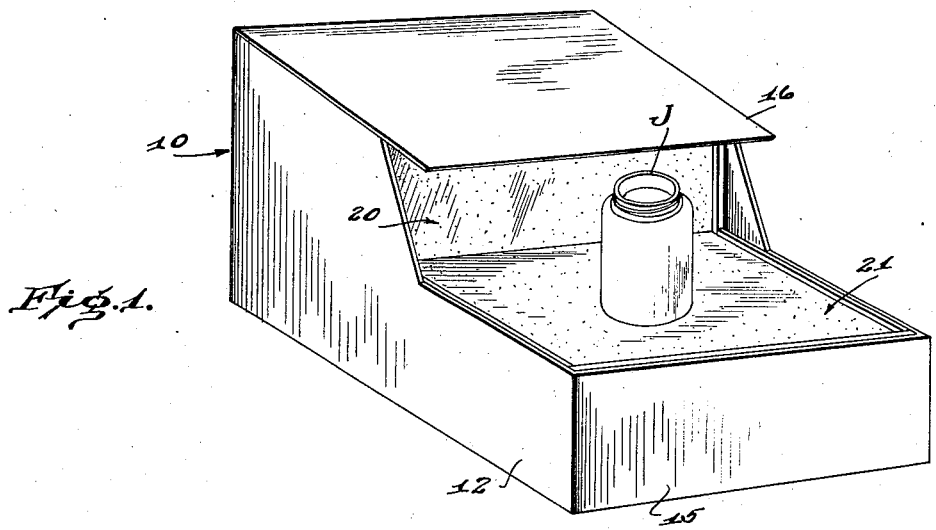
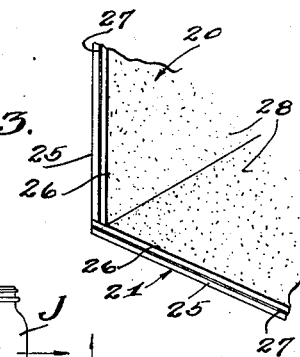
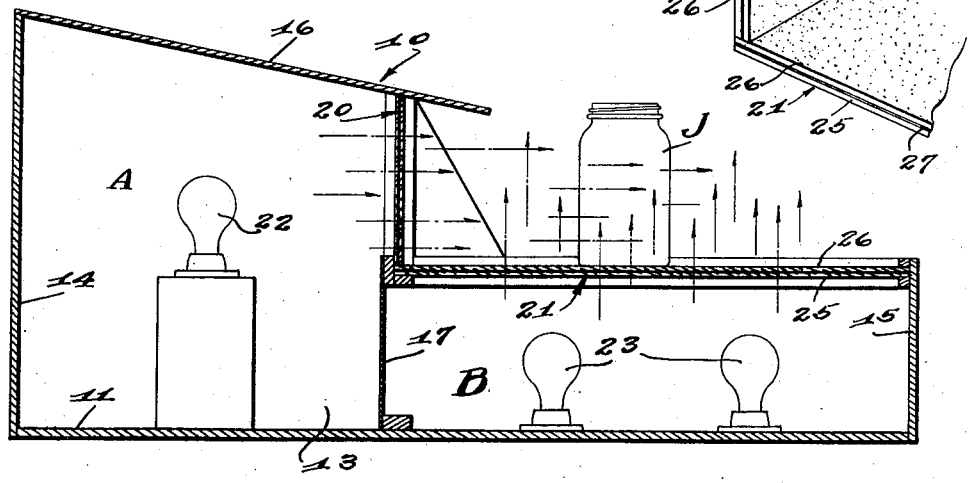
C. A. Everett
INVENTOR
BY Rule + Hoge
ATTORNEYS Patented Oct. 29, 1940

2,219,572

UNITED STATES PATENT OFFICE 2,219,572

METHOD OF AND APPARATUS FOR FACILITATING INSPECTION OF GLASS ARTICLES

Charles A. Everett, Huntington, W. Va., assignor to Owens-Illinois Glass Company, a corporation of Ohio Application October 22, 1938, Serial No. 236,570

7 Claims. (Cl. 88—14)

The present invention relates to testing apparatus and more particularly to an apparatus for facilitating inspection of hollow glass articles for the presence of loose chips therein and for the detection of imperfections in the glass medium of the article itself.

The principal object of the invention is to provide a method of and an apparatus for testing hollow glass articles for the presence of loose chips or the presence of defects in the glass by the use of light beams of contrasting colors which are directed through the articles at angles to each other in such a manner as to illuminate and visibly intensify any chips in the article or defects that may be present in the glass.

In carrying out the above mentioned object, the invention contemplates the provision of a method and an apparatus wherein light rays of one color are directed against the flat bottom of a glass article such as a jar, bottle, tumbler or the like in a direction generally normal to the plane of the bottom so that a large quantity of the rays will by refraction enter the denser glass medium and, after entering, will by total reflection within the glass cause the entire jar to take on a correspondingly colored hue. Simultaneously, light of a contrasting color (preferably of a color widely separated in the spectrum) is directed against the upstanding sides of the jar. If the sides of the jar are curved, many of these latter rays, striking the curved surface at oblique angles, will be totally reflected into the rarer medium. If the jar has flat sides total reflection will occur to a lesser extent. In any event, such rays as do enter the glass medium by refraction will, by subsequent refraction, pass through the jar unimpeded and not be confined therein to any appreciable extent. In the absence of chips in the jar or of defects in the glass medium of the jar, the jar will remain predominantly and uniformly of the color of the confined rays therein. If, however, the jar contains chips, or if defects are present in the glass, the contrastingly colored rays that would normally pass through the jar unimpeded will to a very great extent be reflected from the irregular surfaces of the chips or defective portions of the jar and cause the chips or defective portions of the jar to take on the contrasting color.

Other objects of the invention not at this time enumerated will become apparent hereinafter.

In the accompanying drawing:

Fig. 1 is a perspective view of a testing apparatus constructed in accordance with the principles of the present invention;

Fig. 2 is a longitudinal sectional view taken vertically through the apparatus; and Fig. 3 is a fragmentary perspective view showing adjacent corners of a pair of light diffusing panels employed in connection with the invention.

The apparatus comprises a casing 10 having a bottom 11, side walls 12 and 13, end walls 14 and 15, and a top 16, all of which are formed of sheet metal or other opaque material. A transverse partition 17, also formed of an opaque material, divides the casing 10 into adjacent light-insulated compartments A and B. The compartment A is provided with a vertical translucent panel or window 20, while the compartment B is provided with a horizontal translucent panel or window 21, the two panels being disposed at right angles to each other as shown in Fig. 3 and the former extending upwardly from one edge of the latter. A lamp 22 is positioned in the compartment A behind the panel 20 in such a manner that light emitted from the former will pass generally horizontally through the latter. A pair of lamps 23 are positioned in the compartment B below the panel 21 in such a manner that light emitted from the lamps will pass generally upwardly through the panel.

The panel 20 is red, i. e., it is designed so that it will exclude passage of all rays issuing from the lamp 22 except the red. Similarly, the panel 21 is green, excluding passage of any rays except the latter. For convenience of manufacture, the panels 20 and 21 may each be constructed of two panes of glass 25 and 26 separated by a sheet 27 of transparent gelatine, Cellophane or other cellulose ester, suitably colored to obtain the desired filter effect. The inner panels 25 are preferably of clear transparent glass while the outer surfaces of the panes 26 are frosted as at 28, the frosting effect being obtained by a sand blasting operation and serving to disperse the red and green light rays issuing from the two panels 20 and 21 respectively.

In the inspection of glass articles having curved surfaces such as the jar J shown in the drawing, the article is placed upright on the upper surface of the panel 21 and rays of green light are passed upwardly therethrough and the examiner views the articles from above and in the path of the green light. Because of the fact that the plane of the bottom of the jar is opposed to or normal to the generally upwardly directed green light rays, many of these rays will be refracted into the denser glass medium and will readily enter the bottom and sides of the jar while comparatively few rays will be reflected into the rarer air medium. Many of these rays that do enter the glass medium will strike the surface of the outer air medium at an angle smaller than the critical angle of air and glass and therefore will be totally reflected and confined within the glass medium. These rays, readily entering the glass medium, will cause the jar to take on a brilliant green hue despite the issuance of red light rays from the panel 20.

The red rays passing generally horizontally from the panel 20 will strike the curved sides of the jar at various oblique angles and many thereof will be totally reflected into the thinner air medium. However, because of the fact that when the incident beam is in the rarer medium a smaller critical angle obtains, a smaller fraction of the incident energy is reflected from the denser medium and an appreciable portion of the red rays striking the curved surface of the glass jar will enter the glass medium. Most of these entering rays however, being normal or substantially so to the inner and outer surfaces of the jar, will again be refracted into the rarer air medium or, in other words, will simply pass through the jar and will not be reflected within the glass medium and confined therein as are the green rays. The consequent result will be that the green rays confined within the glass medium will completely predominate the red rays and cause the jar to assume a predominantly green hue.

In the event that any chips are present in the jar or that the jar contains any defects in the glass itself, the red rays that normally would pass by successive refractions from the rarer air medium through the denser glass medium and out again into the air medium, will to a great extent be reflected from the chips or imperfections and cause the latter to take on a red hue which is clearly predominant over the green, and serves to attract immediate attention on the part of the observer to the presence of chips or other defects.

In using the testing apparatus to facilitate inspection of jars or other articles having straight sides or having irregular sides, substantially the same phenomena of refraction and reflection obtain. If the articles are hollow the green rays passing generally vertically upwardly from beneath the same will be more or less confined by total reflection within the glass medium while the red rays passing horizontally therethrough will encounter surfaces that are more or less normal to these latter rays and they will therefore in the absence of chips or defects pass through the article unimpeded by successive refractions.

In testing solid glass articles or hollow glass articles of a shape wherein there is a tendency for the horizontally directed red rays of light and for the vertically directed rays of green light to be refracted equally into the glass medium, the apparatus herein described will be effective in the detection of chips or defects inasmuch as the irregular surfaces of the chips or defects will reflect light rays of both colors and cause the chips to become illuminated to a greater extent than the main body of the article will become illuminated by the phenomenon of scattered light.

Modifications may be resorted to within the spirit and scope of the appended claims.

I claim:

1. A testing apparatus for glass articles comprising a hollow substantially L-shaped casing, a partition in said casing at the juncture of the arms of the L dividing the same into horizontal and vertical compartments, a vertical translucent filter panel adapted to transmit light of one color therethrough and providing a window for one compartment, an article support comprising a horizontal translucent filter panel adapted to transmit light of a widely contrasting color therethrough and providing a window for the other compartment, said panels being disposed adjacent and at an angle to each other whereby light rays issuing therefrom will intersect in an article positioned upon said support, and means in each compartment for emitting light rays.

2. The method of inspecting hollow glass articles such as jars having a substantially plane bottom surface and a curved side wall which consists in directing rays of light of one color in the spectrum in directions generally upward normal to the plane surface and upwardly through the side wall whereby a major portion of such rays will by refraction enter the denser medium and by total reflection within the glass medium largely be confined therein and cause the article to assume a correspondingly colored predominant hue, simultaneously directing rays of light of a contrasting color in the spectrum through the curved surface at angles to the first rays whereby such rays by successive refractions will pass through the article and not be confined to any appreciable extent therein and whereby in the event of defects within the glass medium or chips within the article the latter rays will be reflected from the irregular surfaces of the defective portions or chips and cause the latter to be illuminated and assume a correspondingly colored hue and visually examining the article from a position above it, in the path of the upwardly directed light to detect the presence of chips or fractures as indicated by the reflection of the contrasting color to the eye of the examiner.

3. The method of inspecting glass articles such as jars having a substantially plane surface and a curved side wall which consists in directing rays of light of a color adjacent the short wave length end of the spectrum in directions generally upward normal to the plane surface and upwardly through the side wall whereby a major portion of such rays will by refraction enter the denser medium and by total reflection within the glass medium largely be confined therein and cause the article to assume a correspondingly colored predominant hue, simultaneously directing rays of light of a color adjacent the long wave length end of the spectrum through the curved surface at angles to the first rays whereby such latter rays will by successive refractions pass through the article and not be to any appreciable extent confined therein and whereby in the event of defects within the glass medium or chips within the article the latter rays will be reflected from the irregular surfaces of the defective portions or chips and cause the latter to assume a correspondingly colored hue and visually examining the article from a position above it, in the path of the upwardly directed light to detect the presence of chips or fractures as indicated by the reflection of the color of long wave length to the eye of the examiner.

4. The method of inspecting glass articles such as jars having a substantially plane surface and a curved side wall which consists in directing rays of green light in directions generally upward normal to the plane surface and upwardly through the side wall whereby a major portion of such rays will by refraction enter the denser medium of the article and by total reflection within the glass medium largely be confined therein and cause the article to assume a predominately green hue and simultaneously directing rays of red light through the curved surface at angles to the first rays whereby such latter rays by successive refractions will pass through the article and not be confined to any appreciable extent therein and whereby in the event of defects within the glass or of chips within the article the latter rays will be reflected from the irregular surfaces of the defective portions or chips and cause the latter to assume a red hue and visually examining the article from a position above it, in the path of the upwardly directed light to detect the presence of chips or fractures as indicated by the reflection of red light to the eye of the examiner.

5. The method of inspecting glass articles such as jars, bottles and the like having a substantially flat bottom and curved sides which consists in directing rays of green light upwardly into the bottom and sides whereby some of the rays will enter the glass medium of the article by refraction and will by total reflection largely be confined within the article while scattered light issuing therefrom will cause the latter to assume a predominately green hue, simultaneously directing rays of red light through the curved surface whereby some of the latter rays will enter the glass medium by refraction and will by successive refractions pass through the article and out of the medium substantially unimpeded and visually examining the article from a position above it, in the path of the upwardly directed light to detect the presence of chips or fractures as indicated by the reflection of red light to the eye of the examiner.

6. The method of inspecting upright hollow glass articles such as jars, tumblers, bottles and the like which consists in directing rays of one color in the spectrum generally upwardly through the glass article and simultaneously directing rays of a definitely contrasting color generally transversely through the article, and visually examining the article from a position above it in the path of the upwardly directed light to detect the presence of chips or fractures as indicated by the reflection of the contrasting color to the eye of the examiner.

7. The method of inspecting glass containers, which includes directing rays of one color substantially upward into the container and simultaneously directing rays of another distinctly contrasting color generally horizontally into the container and visually examining the container from a position above it in the path of the upwardly directed light to detect the presence of chips or fractures as indicated by the reflection of the contrasting color to the eye of the examiner.

CHARLES A. EVERETT.